(12) United States Patent
Favero et al.

(10) Patent No.: US 10,106,443 B2
(45) Date of Patent: Oct. 23, 2018

(54) COMPOSITION FOR TREATING SUSPENSIONS OF SOLID PARTICLES IN WATER AND METHOD USING SAID COMPOSITION

(71) Applicants: Cedrick Favero, Saint Romain le Puy (FR); Morgan Tizzotti, Lyons (FR); Trong Dang-Vu, Edmonton (CA)

(72) Inventors: Cedrick Favero, Saint Romain le Puy (FR); Morgan Tizzotti, Lyons (FR); Trong Dang-Vu, Edmonton (CA)

(73) Assignee: S.P.C.M. SA (FR)

( * ) Notice: Subject to any disclaimer, the term of this patent is extended or adjusted under 35 U.S.C. 154(b) by 275 days.

(21) Appl. No.: 13/870,746

(22) Filed: Apr. 25, 2013

(65) Prior Publication Data

US 2014/0319070 A1    Oct. 30, 2014

(51) Int. Cl.
| | | |
|---|---|---|
| *C08K 3/105* | (2018.01) | |
| *C02F 1/56* | (2006.01) | |
| *C08L 33/26* | (2006.01) | |
| *C02F 1/52* | (2006.01) | |

(52) U.S. Cl.
CPC .............. *C02F 1/5245* (2013.01); *C02F 1/56* (2013.01); *C08K 3/105* (2018.01); *C08L 33/26* (2013.01)

(58) Field of Classification Search
None
See application file for complete search history.

(56) References Cited

U.S. PATENT DOCUMENTS

| | | | | |
|---|---|---|---|---|
| 3,493,500 A | * | 2/1970 | Volk .................. | C08F 20/56 209/5 |
| 4,110,520 A | * | 8/1978 | Miyajima ............. | C08F 8/30 525/329.4 |
| 4,347,140 A | | 8/1982 | Condolios et al. | |
| 4,482,468 A | * | 11/1984 | Lamberti ............. | C11D 1/66 510/108 |
| 4,696,962 A | * | 9/1987 | Danner ............... | B01F 17/005 524/140 |
| 5,169,894 A | * | 12/1992 | Holland .............. | B01F 17/0092 524/376 |
| 7,553,423 B2 | * | 6/2009 | Buddenberg .......... | C02F 11/14 106/697 |
| 7,582,444 B2 | * | 9/2009 | Hughes ............... | C13K 1/04 127/55 |
| 7,901,583 B2 | * | 3/2011 | McColl ............... | B03D 3/06 210/710 |
| 2003/0118629 A1 | * | 6/2003 | Scholz ............... | A01N 59/12 424/443 |
| 2007/0187333 A1 | * | 8/2007 | Whittaker ............ | C02F 1/56 210/723 |

FOREIGN PATENT DOCUMENTS

| | | |
|---|---|---|
| CA | 1273888 A | 9/1990 |
| CA | 2407869 A1 | 12/2001 |
| CA | 2515581 A1 | 7/2004 |
| CA | 2682542 A1 | 4/2010 |
| WO | 9605146 A1 | 2/1996 |
| WO | 2012018514 A2 | 2/2012 |

OTHER PUBLICATIONS

Pumpschool, When to use a Positive Displacement Pump, Mar. 9, 2008.*

* cited by examiner

*Primary Examiner* — Bobby Ramdhanie
*Assistant Examiner* — Donovan Bui-Huynh
(74) *Attorney, Agent, or Firm* — Forge IP, PLLC

(57) ABSTRACT

A composition for treating an aqueous suspension of mineral particles includes at least one water soluble polymer and at least one calcium salt, magnesium salt or both a Calcium salt and a Magnesium salt. The composition is in powder form.

17 Claims, No Drawings

COMPOSITION FOR TREATING SUSPENSIONS OF SOLID PARTICLES IN WATER AND METHOD USING SAID COMPOSITION

FIELD OF THE INVENTION

The invention relates to a composition for treating a suspension of mineral particles in water, such as mineral tailings and a method using said composition for treating said suspension.

BACKGROUND OF THE INVENTION

In a first aspect, the invention relates to a composition for treating suspension of mineral particles in water, said composition comprising an anionic water soluble polymer and a salt of Calcium and/or Magnesium. The second aspect of the invention is a method using said composition for treating said suspension, comprising contacting the composition with the suspension.

Suspensions of mineral particles in water include all types of tailings, or waste materials. The suspensions result from mineral ores processes. They are for instance industrial tailings and all mine wash and waste products resulting from exploiting mines, such as, coal mines, diamonds mines, phosphate mines, metal mines (alumina, platinum, iron, gold, copper, silver, etc. . . . ). Suspensions can also result from drilling mud or tailings derived from the treatment of oil sand. These suspensions generally comprise mineral particles such as clays, sediments, sand, metal oxides, and may contain oil mixed with water.

The treatment of such tailings and other waste material has become a technical, environmental and public policy issue.

It is common practice to use synthetic or natural polymers such as coagulants and flocculants to separate the solids from the liquid.

For a long time, and even nowadays, mineral tailings produced by physical or chemical ore treatment methods have been stored above ground in retention lagoons, ponds, dam or embankments in semi-liquid form. These large volumes of stored tailings therefore create a real hazard, notably if the dikes break.

The accidents related to ponds and dam failures occur worldwide and are unpredictable:
  Europe (14%) is the second world zone on tailings dam incidents, only surpassed by the USA (43%).
  All the European tailings dam failures have occurred in dams of less than 45 m high, of which one third were in dams of 20-30 m in height.
  Most of these incidents are related to meteorological causes (26% to unusual rainfall and 3% to snow). Incidents due to seismic liquefaction accounts for 14% of incidents in the world.
  Over 85% of the accidents occurred in active tailings dams, and 15% of the incidents were related to abandoned dams.

The improvement of chemical and mechanical treatments of tailings is therefore a great challenge that needs to be addressed.

Various attempts were made in the past decades to increase the settling rate of the tailings in order to efficiently recycle water and reduce the volume of tailings ponds. The main physical treatments include centrifugation, filtration, electrophoresis and electro-coagulation.

On the other hand, chemical methods are emerging. They include process involving the addition of chemicals such as sodium silicate, organic flocculants, inorganic coagulants, oxidizing and reducing agents and most recently carbon dioxide.

In 1979-1980, Alsthom Atlantique and SNF (U.S. Pat. No. 4,347,140) developed a multistep flocculation system (super-flocculation) specifically designed for treating clay lagoons from phosphate production in Florida.

The treatment of suspensions was continuously studied in 1986 according to the method described in CA 1,273,888, then in 1994 in patent WO 96/05146, in 2000 in patent CA 2,407,869 and in 2004 in patent CA 2,515,581.

In patent CA 2 682 542, the process involves the addition of polymers modified by copolymerization and/or branching. Polymers having hydrophobic groups which have also been studied showed some improvement.

Pre-treatment of tailings with multivalent cations before adding a flocculant is described for example in articles "flocculation and dewatering of Alberta oil sands tailings" (S. Ramachandra Rao), and "Flocculation of the Syncrude fine tailings" (A. Sworska).

A particular attention has recently been paid to hybrid organic-inorganic PAM containing multivalent cations. An example is Al-PAM developed by Xu and coworkers in their lab and published in article "Polymer aids for settling and filtration of oil sands tailings". Despite these polymers has been claimed to be promising for oil sands mature fine tailings (MFT) treatment, their preparation, stability and performances remain to be verified at larger scale.

The article "Effect of multivalent salts Calcium and Aluminium on the flocculation of kaolin suspension with anionic polyacrylamide" (Felicia F. Peng) shows that both $Ca^{2+}$ and $Al^{3+}$ affect negatively the flocculation which means that the use multivalent ions does not improve flocculation in any cases.

WO 2012/018514 describes a method for dispersing and aggregating components of mineral slurries with zeolite and a polymer obtained by polymerization of calcium diacrylate. Polymerization of this monomer is technically difficult, and flocculation efficiency is not optimum.

Despite great advances in research over the last 10 years, there is still a need to develop new and simple solutions that may enhance the speed and amount of water released from the tailings. Improvement of the physical characteristics of the produced tailings is also sought. As industrials are very concerned by simple process, it is still an objective of the present invention to find simple and industrial method to improve flocculation of tailings.

SUMMARY OF THE INVENTION

The present invention addresses the above needs by providing a composition for improving the treatment of suspensions of solid particles in water thanks to specific combination of a water-soluble polymer and Calcium and/or Magnesium salts. The invention also relates to a method using said composition for treating said suspension, comprising contacting the composition with the suspension.

According to the invention, it was surprisingly found that the use of a specific combination of water-soluble polymers and Calcium and/or Magnesium salts significantly improves the performances of tailings treatment such as tailings concentration in thickener, the flocculation, the drying and solidification stage of the suspensions of mineral particles in water, or the mechanical treatment of treated tailings.

The use of the composition increases the drainage, water release of the tailings. It also improves the clarity of the released fluid (also called the liquor) that allows the clarified water to be reused and made immediately available for recirculation to the plant. The treated suspension solidifies much faster, resulting in improved dry tailings properties. It improves also cake strength.

Other advantages of the invention are that the composition is easy to transport and/or to handle and/or to use, the method is easy to industrialize. All these features are very beneficial for the industrials that need simple and economically feasible solutions.

DETAILED DESCRIPTION OF THE INVENTION

The invention relates to a composition for treating an aqueous suspension of mineral particles, said composition comprising:
- at least one water soluble polymer,
- at least one Calcium and/or Magnesium salt, wherein the composition is in powder form.

Powder form includes all forms of solid substance in the form of particles having variable forms (spherical or not), and variable particle sizes. According to the invention, the composition may comprise a low amount of humidity which does not affect its manipulability.

It was found that a specific weight ratio between the water soluble polymer and the Calcium and/or Magnesium salts is preferred to obtain an optimum flocculation of tailings. The weight ratio is comprised between 99/1 to 20/80, preferably between 90/10 to 30/70, and more preferably between 80/20 to 40/60.

When the composition contains too much polymer as compared to the salts, improvement of the flocculation is less significant. However, if Calcium and/or Magnesium salts content is too high, the efficiency of the flocculation decreases.

The composition is prepared by mixing the polymer in powder form with the salt in powder form.

Calcium salts are preferably chosen from the group containing calcium chloride, calcium acetate, calcium sulfate, calcium nitrate, calcium hydroxide, calcium carbonate or a mixture thereof. Magnesium salts are preferably chosen from the group containing magnesium chloride, magnesium acetate, magnesium sulfate, magnesium nitrate, magnesium hydroxide, magnesium carbonate, or a mixture thereof. Mixture of Calcium salts and Magnesium salts may be used.

It was found that the nature of the source of calcium and magnesium salts has an important role in the flocculation performances.

In a preferred embodiment, calcium salts are preferably calcium chloride, calcium acetate, calcium sulfate, calcium nitrate, or mixture thereof. More preferably, calcium salts are calcium chloride or calcium acetate, or mixture thereof.

In another embodiment, magnesium salts are preferably magnesium chloride, magnesium acetate, magnesium sulfate, or mixture thereof. More preferably, magnesium salts are magnesium chloride or magnesium acetate, or mixture thereof.

The composition may also contain a monovalent salt such as sodium chloride. In this case, the molar ratio between divalent cations and monovalent cations is preferably 0.1 to 40, more preferably 0.2 to 10, and more preferably 0.5 to 5.

In a preferred embodiment, the composition of the invention does not contain trivalent cations, such as $Al^{3+}$. The polymers tend to precipitate in presence of such trivalent cations that leads to a detrimental effect on the flocculation.

The composition may also contain at least another polymer different from the first one. Theses polymers may be synthetic or natural and are preferably water-soluble. It can be a dispersant, a coagulant or a flocculant.

Water soluble polymer is preferably a synthetic polymer obtained by the polymerization of at least one non-ionic monomer and at least one anionic monomer.

Non-ionic monomers are preferably selected from the group comprising acrylamide; methacrylamide; N-mono derivatives of acrylamide; N-mono derivatives of methacrylamide; N,N derivatives of acrylamide; N,N derivatives of methacrylamide; acrylic esters; and methacrylic esters.

The most preferred non-ionic monomer is acrylamide.

Anionic monomers are preferably selected from the group comprising monomers having a carboxylic function and salts thereof; monomers having a sulfonic acid function and salts thereof; monomers having a phosphonic acid function and salts thereof. They include for instance acrylic acid, acrylamide tertio butyl sulfonic acid, methacrylic acid, maleic acid, itaconic acid; and hemi esters thereof.

The most preferred anionic monomers are acrylic acid, acrylamide tertio butyl sulfonic acid (ATBS), and salts thereof. Generally, salts are alkaline salts, alkaline earth salts or ammonium salts.

Water soluble polymer may be a post-hydrolyzed polymer comprising acrylamide and carboxylic functions.

Water soluble polymer may be obtained by the polymerization of at least one non-ionic monomer and at least one anionic monomer and optionally at least one cationic monomer, and/or at least one monomer having a hydrophobic character in a range comprised between 0.001 and 1 mol %. This additional monomer may be non-ionic or ionic.

Cationic monomers are preferably selected from the group comprising dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); methacrylamidopropyltrimethylammonium chloride (MAPTAC).

Monomer having a hydrophobic character can be preferably selected from the group comprising (meth)acrylic acid esters having an alkyl, arylalkyl or ethoxylated chain; derivatives of (meth)acrylamide having an alkyl, arylalkyl or dialkyl chain; cationic allyl derivatives; anionic or cationic hydrophobic (meth)acryloyl derivatives; and anionic or cationic monomers derivatives of (meth)acrylamide bearing a hydrophobic chain.

Other monomers than cationic monomer or monomer having a hydrophobic character may be added during polymerization, for example N-Vinyl Pyrrolidone (NVP), or AcryloyMorpholine (ACMO).

In a known manner, the polymer is linear or structured. As is known, a structured polymer is a polymer that can have the form of a star, a comb, or has pending groups of pending chains on the side of the main chain.

For instance, branching can preferably be carried out during the polymerization of the monomers, in the presence of a branching/crosslinking agent and possibly a transfer agent. A non-exhaustive list of branching agents includes: methylenebisacrylamide (MBA), ethylene glycol diacrylate, polyethylene glycol di methacrylate, vinyloxyethyl acrylate, vinyloxyethyl methacrylate, triallylamine, glyoxal, compounds of the glycidyl ether type such as ethylene glycol diglycidyl ether, or epoxies or any other method known to the person skilled in the art, producing branching.

The amount of branching/crosslinking agent in the monomer mixture is less than 1% in weight relative to the monomer content.

The polymerization can be carried out according to any polymerization techniques well known to a person skilled in the art: solution polymerization, suspension polymerization, gel polymerization, precipitation polymerization, emulsion polymerization (aqueous or reverse) followed by an isolation step in order to obtain a powder, for example a spray drying step, or micellar polymerization followed by an isolation step for example a precipitation step in order to obtain a powder.

The polymerization is generally a free radical polymerization preferably by inverse emulsion polymerization or gel polymerization. By free radical polymerization, we include free radical polymerization by means of U.V. azoic, redox or thermal initiators and also Controlled Radical Polymerization (CRP) techniques or template polymerization techniques.

The water-soluble polymer has an anionicity preferably ranging from between 10 to 55 mol %, preferably from 20 to 50 mol %. The molecular weight of the polymer is preferably comprised between 5 and 40 millions daltons, and more preferably between 7 and 20 millions.

It was found that the simultaneous addition of water soluble polymer and Calcium and/or Magnesium salts leads to an optimal flocculation of tailings.

The invention also relates to a method for treating an aqueous suspension of mineral particles comprising:
  preparing a composition comprising at least one water soluble polymer, and at least one Calcium and/or Magnesium salt,
  contacting the said composition with the suspension.

According to the method of the invention, the composition contacting the suspension has a liquid form such as a solution or dispersion or emulsion, or a solid form.

In the composition, the weight ratio between the water soluble polymer and the Calcium and/or Magnesium is preferably comprised between 99/1 to 20/80, preferably between 90/10 to 30/70, and more preferably between 80/20 to 40/60.

Most of the time, the ratio between the water soluble polymer and the Calcium and/or Magnesium varies and depends on the nature, the composition and the source of the tailing. Especially for the treatment of MFT, the ratio will be adapted by the person skilled in the art depending on the composition of MFT, itself depending on its source and method of production.

According to a specific embodiment, the composition is added into a thickener containing the suspension to treat. In a typical mineral processing operation, tailings are often concentrated by flocculation process in a thickener to give higher density underflow, and to recover the process water. The addition of the composition enhances the concentration of the underflow and increases the quality of the liquor. According to another embodiment, the suspension is transported in a pipe to the thickener and the composition is added into the pipe.

According to another specific embodiment, the composition is added to the suspension of solid particles in water, during the transport of the said suspension to a deposition area. Preferably, the composition is added into the pipe transporting the said suspension to a deposition area on which the treated suspension is spread of for solidifying. Examples of such treatment are beach drying, or deep cell. It is particularly suitable for fresh tailings.

According to another specific embodiment, the composition is added to the suspension, followed by a mechanical treatment such as centrifugation, screw press and filtration, etc.

The method of the invention most preferably does not comprise a pre-treatment stage of the suspension with multivalent cations containing compounds before the addition of the composition to the suspension.

The composition may be added at different stage of the suspension treatment, i.e. for example into the pipe transporting the suspension to a thickener and in the underflow of the thickener.

As mentioned above, the polymer may be obtained according to any polymerization techniques well known to a person skilled in the art: solution polymerization, suspension polymerization, gel polymerization, precipitation polymerization, micellar polymerization, emulsion polymerization (aqueous or reverse). The polymerization may be followed or not by an isolation step.

Therefore, whatever the polymerization process, the composition used in the method of the invention may have a liquid form such as a solution or dispersion or emulsion, or a solid form.

Advantageously, the composition has a liquid form and preferably is a solution prepared with a polymer having a powder form.

According to a first embodiment, the method comprises preparing said solution as the following:
  mixing powders of polymer and Calcium and/or Magnesium salt,
  dissolving partially or totally the powder in water.

The dispersing device used for dissolving the powder is preferably a Polymer Slicing Unit (PSU) disclosed in WO 2008/107492 or in WO 2011/107683.

The device for dispersing and grinding the powder composition, also referred to as a PSU (polymer slicing unit) comprising:
  a cone for wetting the powder composition connected to a primary water inlet circuit,
  at the lower end of the cone:
    a dispersed composition grinding and drainage chamber comprising:
      a motor-driven rotor equipped with blades,
      a fixed stator constituted of a cylinder equipped with thin slots,
    over all or part of the periphery of the chamber, a ring supplied by a secondary water circuit, the ring communicating with the chamber so as to ensure the spraying of pressurized water over the outside of the stator thus enabling the release of the ground and swollen composition at the surface of said stator.

The method may further comprises diluting the resulting composition with water. Practically, it comprises transporting the composition into at least one tank for hydrating and dissolving the dispersed composition.

Preferably two dissolution tanks are used, having each one a volume generally comprise between 4 to 5 m3. These tanks are generally vigorously stirred in order to promote the dissolution of the composition. Moreover, these two tanks may work in series, continuously, in parallel, or by transfer from one to the other (flip-flop).

The use of the composition of the invention with this method provides an outstanding advantage consisting of a significant decrease of the viscosity of the liquid into the hydrating tank compare to traditional polymer use alone.

The viscosity is divided at least by a factor 2 to 10 which leads to a far better hydration and dispersion of the composition in water.

The concentration of polymer into the dissolution tank may be increased without any "fisheye" problem or stirring difficulty related to a high viscosity.

Generally the total residence time of a polymer in the hydration tanks is between 20 and 30 minutes.

The method further comprises:
transporting the resulting solution to an injection point,
introducing the solution directly into the pipeline transporting the aqueous suspension of mineral particles.

This preferred method of the invention has a lot of technical advantages because the method is technically easier to industrialize. The powdered composition comprising the water soluble polymer in powder form and the Calcium and/or Magnesium salt in powder form is made by the supplier in a ready-to-use form. The transport is economically efficient because no water is transported. The powdered composition is easier to handle by the end-user. And finally the end-user may easily dissolve the powdered composition thanks to a specific designed and efficient dispersion device.

According to a second embodiment, the method comprises preparing said solution by dissolving the polymer (in powder form) in a solution of Calcium and/or Magnesium salt.

According to a third embodiment, the method comprises preparing said solution by dissolving partially or totally the polymer (in powder form) in water and adding in the mixture obtained the Calcium and/or Magnesium salt having a powder form.

According to a fourth embodiment, the method comprises preparing said solution by:
dissolving the polymer (in powder form) in water in order to obtain a mother solution comprising between 0.1 wt % to 3 wt % of polymer,
dissolving Calcium and/or Magnesium salt in a separate aqueous solution,
diluting the said "mother solution" with the aqueous solution comprising Calcium and/or Magnesium salt.

The total dosage of polymer added to the suspension to be treated is between 50 and 5,000 g per ton of dry solids of suspension, preferably between 250 and 2,000 g/t, and more preferably between 500 and 1,500 g/t, depending on the nature and the composition of the tailings to be treated.

Another polymer similar or different from the polymer used in the composition may be added before or after the addition of the composition. The polymer may be synthetic or natural and is preferably water-soluble. It can be a dispersant, a coagulant or a flocculant.

Generally, suspensions are concentrated, and contains between 10% and 60% solids, preferably between 20 and 50% solids. But suspensions having lower solids content may be efficiently treated with the method of the invention.

The method using the composition permits to treat more efficiently mineral material, especially the suspensions having high clay content.

It has been discovered that the method according to the invention is especially useful for the treatment of tailings resulting from oil sand extraction, such as Mature Fine Tailings (MFT).

The treatment of oil sand tailings has recently become an increasing issue in Canada. The tailings waste goes to tailings pond or thickeners for further water management. The oil sands tailings are alkaline aqueous suspensions which contain un-recovered residual bitumen, salts, soluble organic compounds, sands and clays. The tailings are discharged to tailings ponds for storage.

The tailings ponds are also closely regulated by the government. Two to four barrels of fresh water are required per barrel of oil produced from the surface mining method. After the tailings slurry is discharged to the tailings ponds, the coarse solids segregate as the dykes while most of the water and fine solids remain as suspensions in the tailings pond. A layer of mature fine tails (MFT) develops after two to three years. MFT consolidates very slowly. The completion of the settling process is predicted to take almost a century.

The method of the invention is very efficient for treating MFT and increases the performances in terms of yield strength of treated MFT, net water release, and quality of the water release. Therefore, the method of the invention comprises introducing the solution directly into the pipeline transporting the MFT from a pound to a deposition area.

Obviously, the following examples are only given to illustrate the subject matter of the invention, which is in no way restricted to them.

EXAMPLE 1

Two anionic polyacrylamides A and B have been prepared by the gel polymerization method. Both are 30 mol % anionic (30 mol % acrylate, and 70 mol % acrylamide) and have the same high molecular weight. The counter cation for negative charges of polymer A is sodium ($Na+$), the counter cation of polymer B is calcium ($Ca2+$).

Polymers were stirred into tap water to provide aqueous solutions at concentrations of 0.4 wt %. In relevant cases, powders of $CaCl2$ and polymer A were mixed together and then added into water simultaneously. All solutions were mechanically stirred at 500 rpm until complete dissolution and obtention of clear and homogeneous solutions.

Flocculation tests have been performed using Mature Fine Tailings (MFT) with solid content of 31.7 wt %. For each test, the appropriate volume of polymer solution was added into 200 g of MFT and then the whole mixture was mixed manually until flocculation and water release were observed.

Results displayed in Table 1 show that polymer B led to a less viscous solution than polymer A despite the same concentration in polymer was used. It also gave a better NWR. However, polymer B required longer time to dissolve.

Using mixtures of (polymer A+$CaCl2$) allows taking benefit of the good performances displayed by polymer B (i.e. lower viscosity and higher NWR) while keeping the advantages of polymer A in terms of dissolution time and dosage.

It is clear that the weight ratio of $CaCl2$ must be carefully optimized when mixed with polymer A. Added in too important quantities, it significantly increases the dissolution time despite further lowering of the final viscosity and does not necessarily result in higher NWR.

According to data disclosed in Table 1, a mixture composed of 80 wt % polymer A+20 wt % $CaCl2$ was found to be the best compromise in terms of dewatering performances (NWR and dosage) and processing parameters (dissolution time and viscosity) for this MFT.

TABLE 1

| Polymer/Mixture | Dissolution time (min) | Viscosity (cP)a | Polymer Dosage (g/dry tonne) | 24 h NWR (mL)b | NWR increase |
|---|---|---|---|---|---|
| A | 30 | 620 | 1100 | 32.3 | Reference |
| B | 90 | 150 | 1100 | 34.7 | +7.5% |
| 90 wt % A + 10 wt % CaCl2 | 30 | 210 | 1100 | 35.2 | +9.0% |
| 80 wt % A + 20 wt % CaCl2 | 30 | 110 | 1100 | 37.8 | +17.0% |
| 70 wt % A + 30 wt % CaCl2 | 40 | 40 | 1100 | 37.4 | +16.7% |
| 60 wt % A + 40 wt % CaCl2 | 120 | 25 | 1100 | 33.1 | +2.5% | aMeasured using a Brookfield viscometer at 30 rpm and room temperature.
bNWR = Net Water Release. It corresponds to the total amount of water recovered during the flocculation test.

EXAMPLE 2

The same two anionic polyacrylamides A and B have been used in Example 2. Polymers were stirred into tap water to provide aqueous solutions at concentrations of 0.4 wt %. In relevant cases, powders of CaCl2 and polymer A were mixed together and then added into water simultaneously. All solutions were mechanically stirred at 500 rpm until complete dissolution and obtention of clear and homogeneous solutions.

Flocculation tests have been performed using MFT with solid content of 33.7 wt % from another source than in Example 1. For each test, the appropriate volume of polymer solution was added into 200 g of MFT and then the whole mixture was mixed manually until flocculation and water release were observed.

Contrary to Example 1, the optimal mixture in terms of NWR is now about 40 wt % polymer A+60 wt % CaCl2 for these MFT from another source. These results in Table 2 emphasize the fact that the weight ratio of CaCl2 must be carefully optimized when mixed with polymer A and depends also on the source of MFT.

TABLE 2

| Polymer/Mixture | Dissolution time (min) | Viscosity (cP)a | Polymer Dosage (g/dry tonne) | 24 h NWR (mL)b | NWR increase |
|---|---|---|---|---|---|
| A | 30 | 620 | 1400 | 8.0 | Reference |
| B | 90 | 150 | 1400 | 14.1 | +76.2% |
| 90 wt % A + 10 wt % CaCl2 | 30 | 210 | 1400 | 13.9 | +73.7% |
| 80 wt % A + 20 wt % CaCl2 | 30 | 110 | 1400 | 15.2 | +90.0% |
| 70 wt % A + 30 wt % CaCl2 | 40 | 40 | 1400 | 20.8 | +160% |
| 60 wt % A + 40 wt % CaCl2 | 120 | 25 | 1400 | 28.3 | +253.8% |
| 50 wt % A + 50 wt % CaCl2 | 150 | 12 | 1400 | 34.0 | +325.0% |
| 40 wt % A + 60 wt % CaCl2 | 175 | 10 | 1400 | 42.8 | +435.0% |
| 30 wt % A + 70 wt % CaCl2 | 175 | 10 | 1400 | 36.3 | +353.8% | aMeasured using a Brookfield viscometer at 30 rpm and room temperature.
bNWR = Net Water Release. It corresponds to the total amount of water recovered during the flocculation test.

EXAMPLE 3

In this example, Test 1 corresponds to the flocculation of MFT (33.7 wt % solid content) using a mixture (50 wt % polymer A+50 wt % CaCl2). In Test 2, 200 g of MFT have been pretreated with an aqueous solution of CaCl2 (Addition of a CaCl2 solution, followed by 5 min mixing), then mixed with a 0.8 wt % solution of polymer A according to the procedure described in Example 1. Quantities of water, polymer A and CaCl2 added into the MFT during Tests 1 and 2 are exactly the same, only differs the sequence of addition of chemicals.

Firstly, one can notice from Table 4 that pretreatment of MFT with an aqueous solution of CaCl2 leads to a significant increase in the viscosity, making MFT harder to pump and to treat as more energy is required during mixing with the polymer solution. Secondly, pretreatment obviously induces a lower NWR than the concomitant addition of both the polymer A and the salt.

TABLE 4

Influence of the treatment process on the NWR.

| Test | Polymer Dosage (g/dry tonne) | Viscosity of MFT at 30 rpm | 24 h NWR (mL) |
|---|---|---|---|
| 1 | 1400 | 700 | 34.0 |
| 2 | 1400 | 2500 | 10.5 |

EXAMPLE 4

Different salts have been tried in combination with polymer A for the treatment of MFT with solid content of 33.7 wt %. Results are displayed in Table 3. For all cases, powders of salt and polymer A were mixed together, added into water simultaneously and then mechanically stirred at 500 rpm to provide aqueous solutions at concentrations of 0.4 wt % in polymer A.

TABLE 3

Influence of the salt used in combination with polymer A on the NWR.

| Polymer/Mixture | Polymer Dosage (g/dry tonne)a | 24 h NWR (mL) | NWR increase |
|---|---|---|---|
| 100 wt % A | 1400 | 8.0 | reference |
| 50 wt % A + 50 wt % CaCl2 | 1400 | 34.0 | +425% |
| 50 wt % A + 50 wt % MgCl2 | 1400 | 36.3 | +454% |
| 50 wt % A + 50 wt % Ca acetate | 1400 | 24.8 | +310% |
| 50 wt % A + 50 wt % Mg acetate | 1400 | 28.6 | +357% |
| 50 wt % A + 50 wt % CaSO4 | 1400 | 13.1 | +164% |
| 50 wt % A + 50 wt % MgSO4 | 1400 | 16.5 | +206% |
| 50 wt % A + 50 wt % Ca(NO3)2 | 1400 | 15.8 | +197% | aOptimal dosage (Polymer + salt) determined during preliminary flocculation tests (Data not shown).

EXAMPLE 5

In this example, Test 3 corresponds to the flocs and the water obtained after flocculation of MFT (33.7 wt % solid content) using a (50 wt % polymer A+50 wt % CaCl2) whereas Test 4 corresponds to the flocs and the water obtained after flocculation of MFT using polymer A alone.

Visual observation during flocculation tests indicated that flocs were denser and more shear resistant when using mixtures of (polymer A+CaCl2) rather than polymer A alone. Also, the water released is clearer when using mixtures of (polymer A+CaCl2).

Turbidity is measured with a turbidimeter Hach Lange Model DR2800. Results are Turbidity for test 3 is 89 FAU and 750 FAU for test 4.

FAU is Formazin Attenuation Units.

What is claimed is:

1. A composition for the treatment of an aqueous suspension of mineral particles, said composition comprising a mixture of:
   at least one water soluble polymer; and
   at least one Calcium salt, Magnesium salt or both a Calcium salt and a Magnesium salt;
   wherein the composition is in powder form;
   wherein, prior to creating the mixture by mixing the at least one water soluble polymer with the at least one Calcium salt, Magnesium salt or both a Calcium salt and a Magnesium salt, the at least one water soluble polymer is a synthetic polymer obtained by polymerization of
   at least one non-ionic monomer selected from the group consisting of acrylamide; methacrylamide; N-mono derivatives of acrylamide; N-mono derivatives of methacrylamide; N,N derivatives of acrylamide; N,N derivatives of methacrylamide; acrylic esters; and methacrylic esters, and
   at least one anionic monomers selected from the group consisting of monomers having a carboxylic function and salts thereof; monomers having a sulfonic acid function and salts thereof; and monomers having a phosphonic acid function and sails thereof; and
   wherein a weight ratio between the water soluble polymer and the at least one Calcium salt. Magnesium salt or both a Calcium salt and a magnesium salt is between 99/1 to 20/80;
   wherein the composition is water soluble; and
   wherein contacting the composition with the aqueous suspension results in a treatment of the aqueous suspension via flocculation of the mineral particles in the aqueous suspension.

2. The composition according to claim 1, wherein the salts are selected from the group consisting of calcium chloride, calcium acetate, calcium sulfate, calcium nitrate, calcium hydroxide, calcium carbonate, magnesium chloride, magnesium acetate, magnesium sulfate, magnesium nitrate, magnesium hydroxide, magnesium carbonate, and mixtures thereof.

3. The composition according to claim 1, wherein the salts are selected from the group consisting of calcium chloride, calcium acetate, magnesium chloride, magnesium acetate, and mixtures thereof.

4. The composition according to claim 1, wherein the non-ionic monomer is acrylamide and the anionic monomers are acrylic acid or acrylamide tertio butyl sulfonic acid (ATBS), and salts thereof.

5. The composition according to claim 1, wherein the at least one water soluble polymer is a synthetic polymer obtained by the polymerization of at least one of the following: at least one non-ionic monomer and at least one anionic monomer and at least one cationic monomer, at least one monomer having a hydrophobic character in a range comprised between 0.001 and 1 mol %, r N-Vinyl Pyrrolidone (NVP), and AcryloyMorpholine (ACMO).

6. The composition according to claim 1, wherein the at least one water-soluble polymer has an anionicity preferably ranging from between 10 to 55 mol % and a molecular weight between 5 and 40 million daltons.

7. A method for treating an aqueous suspension of mineral particles by flocculation, comprising the steps of:
   preparing a composition comprising a mixture of at least one water soluble polymer, and at least one Calcium salt, Magnesium salt, or both a Calcium salt and a Magnesium salt, and
   contacting the composition with the aqueous suspension, wherein, prior to creating the mixture by mixing the at least one water soluble polymer with the at least one Calcium salt, Magnesium salt, or both a Calcium salt and a Magnesium salt, the at least one water soluble polymer is obtained by polymerization of a non-ionic monomer of acrylamide and an a anionic monomer of either acrylic acid or acrylamide tertio butylsulfonic acid (ATBS), and salts thereof;
   wherein a ratio between the water soluble polymer and the at least one Calcium salt, Magnesium salt, or both a Calcium salt and a Magnesium salt is between 99/1 to 20/80:
   wherein the composition is in powder form;
   wherein the composition is water soluble; and
   wherein contacting the composition with the aqueous suspension results in a treatment of the aqueous suspension via flocculation of the mineral particles in the aqueous suspension.

8. The method according to claim 7, wherein the salts are selected from the group consisting of calcium chloride, calcium acetate, calcium sulfate, calcium nitrate, calcium hydroxide, calcium carbonate, magnesium chloride, magnesium acetate, magnesium sulfate, magnesium nitrate, magnesium hydroxide, magnesium carbonate, and mixtures thereof.

9. The method of claim 7, wherein the composition is added into a pipe transporting the suspension to a thickener.

10. The method of claim 7, wherein the composition is added into a thickener containing the suspension to treat.

11. The method of claim 7, wherein the composition is added to the suspension during transport of the suspension to a deposition area.

12. The method of claim 7, wherein the composition is a solution prepared by a method comprising the steps of:
    mixing powders of the at least one water soluble polymer and the salts, and
    dissolving partially or totally the powder mixture in water.

13. The method of claim 7, wherein the composition is a solution prepared by a method comprising the steps of:
    dissolving the at least one water soluble polymer in water in order to obtain a mother solution comprising between 0.1 wt% to 3 wt% of the polymer,
    dissolving the salts in a separate aqueous solution,
    diluting the mother solution with the aqueous solution comprising the salts.

14. The method according to claim 7, wherein the aqueous suspension of mineral particles comprises mature fine tailings (MFT) and the composition is introduced directly into a pipeline transporting the MFT from a pound to a deposition area.

15. The method according to claim 7, wherein a total dosage of polymer added to the suspension is between 50 and 5,000 g per ton of dry solids of suspension.

16. The method of claim 7, wherein the ratio between the water soluble polymer and the salts is between 80/20 to 40/60.

17. The composition according to claim 1, wherein the ratio between the water soluble polymer and the salts is between 80/20 to 40/60.

* * * * *